(12) United States Patent
Li et al.

(10) Patent No.: US 11,979,087 B2
(45) Date of Patent: May 7, 2024

(54) SWITCH POWER SUPPLY CHIP AND SYSTEM

(71) Applicant: SHANGHAI XINLONG SEMICONDUCTOR TECHNOLOGY CO., LTD., Shanghai (CN)

(72) Inventors: Ruiping Li, Shanghai (CN); Bo Chen, Shanghai (CN); Bin Liu, Shanghai (CN)

(73) Assignee: SHANGHAI XINLONG SEMICONDUCTOR TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/767,582

(22) PCT Filed: Jul. 6, 2021

(86) PCT No.: PCT/CN2021/104847
§ 371 (c)(1),
(2) Date: Apr. 8, 2022

(87) PCT Pub. No.: WO2021/254524
PCT Pub. Date: Dec. 23, 2021

(65) Prior Publication Data
US 2024/0106325 A1 Mar. 28, 2024

(30) Foreign Application Priority Data

Feb. 18, 2021 (CN) .......................... 202110186647.8

(51) Int. Cl.
*H02M 3/04* (2006.01)
*H02J 7/34* (2006.01)

(52) U.S. Cl.
CPC ............... *H02M 3/04* (2013.01); *H02J 7/345* (2013.01); *H02J 2207/50* (2020.01)

(58) Field of Classification Search
CPC .. H02M 3/04; H02M 3/18; H02J 7/345; H02J 2207/50
See application file for complete search history.

(56) References Cited

U.S. PATENT DOCUMENTS 3,889,172 A * 6/1975 Lelaidier ............. H02J 7/00718
320/156
4,716,353 A * 12/1987 Engelmann ........... H02M 3/285
320/139

(Continued)

FOREIGN PATENT DOCUMENTS

CN     108347165 A     7/2018
CN     110854985 A     2/2020

(Continued)

OTHER PUBLICATIONS

International Search Report, China National Intellectual Property Administration, Application No. PCT/CN2021/104847, dated Sep. 27, 2021, 4 pages.

*Primary Examiner* — Yusef A Ahmed
(74) *Attorney, Agent, or Firm* — Ziegler IP Law Group

(57) ABSTRACT

A switched-mode power supply (SMPS) chip and system are disclosed, which are used for determining a maximum power output of a solar photovoltaic panel connected to the SMPS chip. The SMPS chip includes a sampled current comparator module, a logic control module connected to the sampled current comparator module, and a charge/discharge control module connected to the logic control module. According to the present invention, an output current from the SMPS system to an external load is detected and serves as a basis for incrementally adjusting a minimum input voltage of the SMPS chip and hence an output voltage of the (Continued)

solar photovoltaic panel. In this way, an output voltage level of solar photovoltaic panel corresponding to the maximum power output thereof under a given condition can be determined. Through keeping the solar photovoltaic panel operating at that output voltage level, it is ensured that the solar photovoltaic panel provides the maximum power output under the given condition.

10 Claims, 7 Drawing Sheets

(56) References Cited

U.S. PATENT DOCUMENTS

| | | | | |
|---|---|---|---|---|
| 5,793,596 | A * | 8/1998 | Jordan | H03K 17/0822 361/18 |
| 6,020,689 | A * | 2/2000 | Gradzki | H05B 41/2983 315/307 |
| 6,469,917 | B1 * | 10/2002 | Ben-Yaakov | H02M 1/4225 363/44 |
| 7,177,166 | B1 * | 2/2007 | Kris | H02M 1/12 323/284 |
| 10,135,347 | B2 * | 11/2018 | Mizoe | H02M 3/33507 |
| 2003/0141856 | A1 * | 7/2003 | Kimura | H02M 3/156 323/282 |
| 2007/0109816 | A1 * | 5/2007 | Yang | H02M 3/33523 363/16 |
| 2008/0198638 | A1 * | 8/2008 | Reinberger | H02M 3/3376 363/21.02 |
| 2010/0066582 | A1 * | 3/2010 | Park | G04F 10/105 341/158 |
| 2012/0113684 | A1 * | 5/2012 | Wang | H02M 3/335 363/21.01 |
| 2013/0088238 | A1 * | 4/2013 | Julicher | G01N 27/66 324/681 |
| 2013/0343097 | A1 * | 12/2013 | Chen | H02M 3/33507 363/21.02 |
| 2014/0132236 | A1 * | 5/2014 | Darmawaskita | H02M 3/156 323/283 |
| 2015/0357924 | A1 * | 12/2015 | Lin | H02M 3/33507 363/21.18 |
| 2016/0111961 | A1 * | 4/2016 | Balakrishnan | H02M 3/33507 363/21.12 |
| 2016/0294282 | A1 * | 10/2016 | Herfurth | H05B 45/375 |
| 2017/0358990 | A1 * | 12/2017 | Papica | H02M 3/33523 |
| 2018/0287479 | A1 * | 10/2018 | Li | H02M 3/33523 |
| 2019/0013733 | A1 * | 1/2019 | Trichy | H02M 1/088 |
| 2019/0196527 | A1 | 6/2019 | Bergogne | |
| 2021/0100082 | A1 * | 4/2021 | Aoki | H05B 45/305 |
| 2021/0384832 | A1 * | 12/2021 | Jiang | H02M 1/0006 |
| 2022/0200466 | A1 * | 6/2022 | Guo | H02M 1/348 |
| 2022/0263403 | A1 * | 8/2022 | Li | H02M 3/156 |
| 2022/0407422 | A1 * | 12/2022 | Qin | H02M 1/0003 |

FOREIGN PATENT DOCUMENTS

| | | |
|---|---|---|
| CN | 212210848 U | 12/2020 |
| CN | 112532047 A | 3/2021 |
| EP | 3502826 A1 | 6/2019 |

* cited by examiner

| time period | switch identifier & status | C1 | C2 | C3 | C4 | comparison result | S1 | S2 |
|---|---|---|---|---|---|---|---|---|
| T1 | K1, K4 closed; K3, K2 opened; K5, K6, K7 opened; K8 closed; K9 closed; K10 opened | charged to Vc1 | restored to initial state | C3 discharged | C4 discharged | Invalid signal | S1 is low, so latch 114 does not receive output from comparator 113 but outputs latched high level | S2 is low, so the timer constant-current source 121 stops discharging the capacitor 204 |
| T2 | capacitor 204 discharged at the constant current I0; K4, K8 closed; K1, K2 opened; K3 opened; K5 opened; K6, K7 opened; K9 opened; K10 opened | maintain at same capacitor voltage as last time instant of previous period | maintain at same capacitor voltage as the last time instant of previous period | C3 discharged | C4 discharged | Invalid signal | S1 is low, so the latch 114 does not receive the output from the comparator 113 but outputs the latched high level | S2 is high, so the timer constant-current source 121 discharges the capacitor 204 |
| T3 | K1, K3, K2 opened; K4 closed; K5, K8 closed; K6, K7 opened; K9 opened; K10 closed | maintain at Vc1 | charged to Vc2 | C3 discharged | C4 discharged | Invalid signal | S1 is low, so the latch 114 does not receive the output from the comparator 113 but outputs the latched high level | S2 is low, so the timer constant-current source 121 stops discharging the capacitor 204 |
| T4 | K1, K4 closed; K3, K2 opened; K5, K8 closed; K6, K7 opened; K9 opened; K10 opened | maintain at Vc1 | maintain at Vc2 | C3 discharged | C4 discharged | Vc1<Vc2 the comparator outputs a high level | S1 is high, so the latch 114 receives, latches and outputs the high level from the comparator 113 | S2 is low, so the timer constant-current source 121 stops discharging the capacitor 204 |
| T5 | K1, K4 opened; K3, K2 closed; K5, K7, K8 opened; K6 closed; K9 closed; K10 opened | C1 discharged | C2 discharged | charged to Vc3 | restored to initial state | Invalid signal | S1 is low, so the latch 114 does not receive the output from the comparator 113 but outputs the latched high level | S2 is low, so the timer constant-current source 121 stops discharging the capacitor 204 |
| T6 | capacitor 204 discharged at the constant current I0; K2, K6 closed; K1, K3 opened; K4 opened; K5 opened; K7, K8 opened; K9 opened; K10 opened | C1 discharged | C2 discharged | maintain at same capacitor voltage as the last time instant of previous period | maintain at same capacitor voltage as the last time instant of previous period | Invalid signal | S1 is low, so the latch 114 does not receive the output from the comparator 113 but outputs the latched high level | S2 is high, so the timer constant-current source 121 discharges the capacitor 204 |
| T7 | K1, K3, K4 opened; K2 closed; K5, K8 opened; K6, K7 closed; K9 opened; K10 closed | C1 discharged | C2 discharged | maintain at Vc3 | maintain at Vc4 | Invalid signal | S1 is low, so the latch 114 does not receive the output from the comparator 113 but outputs the latched high level | S2 is low, so the timer constant-current source 121 stops discharging the capacitor 204 |
| T8 | K1, K4 opened; K3, K2 closed; K5, K8 opened; K6, K7 closed; K9 opened; K10 opened | C1 discharged | C2 discharged | maintain at Vc3 | maintain at Vc4 | Vc3<Vc4 comparator outputs a high level | S1 is high, so the latch 114 receives, latches and outputs the high level from the comparator 113 | S2 is low, so the timer constant-current source 121 stops discharging the capacitor 204 |

Fig. 7

| time period | switch identifier & status | C1 | C2 | C3 | C4 | comparison result | S1 | S2 |
|---|---|---|---|---|---|---|---|---|
| T1 | K1, K4 closed; K3, K2 opened; K5, K6, K7 opened; K8 closed; K9 closed; K10 opened | charged to Vc1 | restored to initial state | C3 discharged | C4 discharged | Invalid signal | S1 is low, so latch 114 does not receive output from comparator 113 but outputs latched high level | S2 is low, so the timer constant-current source 121 stops discharging the capacitor 204 |
| T2 | capacitor 204 discharged at the constant current I0; K4, K8 closed; K1, K2 opened; K3 opened; K5 opened; K6, K7 opened; K9 opened; K10 opened | maintain at same capacitor voltage as last time instant of previous period | maintain at same capacitor voltage as the last time instant of previous period | C3 discharged | C4 discharged | Invalid signal | S1 is low, so the latch 114 does not receive the output from the comparator 113 but outputs the latched high level | S2 is high, so the timer constant-current source 121 discharges the capacitor 204 |
| T3 | K1, K3, K2 opened; K4 closed; K5, K8 closed; K6, K7 opened; K9 opened; K10 closed | maintain at Vc1 | charged to Vc2 | C3 discharged | C4 discharged | Invalid signal | S1 is low, so the latch 114 does not receive the output from the comparator 113 but outputs the latched high level | S2 is low, so the timer constant-current source 121 stops discharging the capacitor 204 |
| T4 | K1, K4 closed; K3, K2 opened; K5, K8 closed; K6, K7 opened; K9 opened; K10 opened | maintain at Vc1 | maintain at Vc2 | C3 discharged | C4 discharged | Vc1<Vc2 the comparator outputs a high level | S1 is high, so the latch 114 receives, latches and outputs the high level from the comparator 113 | S2 is low, so the timer constant-current source 121 stops discharging the capacitor 204 |
| T5 | K1, K4 opened; K3, K2 closed; K5, K7, K8 opened; K6 closed; K9 closed; K10 opened | C1 discharged | C2 discharged | charged to Vc3 | restored to initial state | Invalid signal | S1 is low, so the latch 114 does not receive the output from the comparator 113 but outputs the latched high level | S2 is low, so the timer constant-current source 121 stops discharging the capacitor 204 |
| T6 | capacitor 204 discharged at the constant current I0; K2, K6 closed; K1, K3 opened; K4 opened; K5 opened; K7, K8 opened; K9 opened; K10 opened | C1 discharged | C2 discharged | maintain at same capacitor voltage as the last time instant of previous period | maintain at same capacitor voltage as the last time instant of previous period | Invalid signal | S1 is low, so the latch 114 does not receive the output from the comparator 113 but outputs the latched high level | S2 is high, so the timer constant-current source 121 discharges the capacitor 204 |
| T7 | K1, K3, K4 opened; K2 closed; K5, K8 opened; K6, K7 closed; K9 opened; K10 closed | C1 discharged | C2 discharged | maintain at Vc3 | maintain at Vc4 | Invalid signal | S1 is low, so the latch 114 does not receive the output from the comparator 113 but outputs the latched high level | S2 is low, so the timer constant-current source 121 stops discharging the capacitor 204 |
| T8 | K1, K4 opened; K3, K2 closed; K5, K8 opened; K6, K7 closed; K9 opened; K10 opened | C1 discharged | C2 discharged | maintain at Vc3 | maintain at Vc4 | Vc3<Vc4 comparator outputs a high level | S1 is high, so the latch 114 receives, latches and outputs the high level from the comparator 113 | S2 is low, so the timer constant-current source 121 stops discharging the capacitor 204 |

Fig. 8

SWITCH POWER SUPPLY CHIP AND SYSTEM

TECHNICAL FIELD

The present invention relates to the field of power supply chips, and more particularly to a switched-mode power supply (SMPS) chip and system for determining a maximum power output for a solar photovoltaic panel connected to the SMPS chip.

BACKGROUND

Although solar photovoltaic panels have found extensive use in socioeconomic activities, limited by their own operating mechanism and power output versus voltage (P-U) behavior, the maximum power that a solar photovoltaic panel can provide varies in dependence on a variety of factors including its area that receives illumination by sunlight, the angle at which it is illuminated and the time in a day when it is illuminated. Specifically, the power output of a solar photovoltaic panel may vary both with time and with its output voltage, as shown in FIG. 1. In order to enable full utilization of a solar photovoltaic panel through maximizing its power output, research on maximum power output tracking has been proposed to identify a peak output power level of the solar photovoltaic panel, e.g., as indicated by the point P2 in the P-U profile as shown in FIG. 1, and always maintain this level by automatically adjusting the solar panel's output voltage in real time. Therefore, for this research, under a given condition, it is very important to determine in real time an output voltage level where the power output of the solar photovoltaic panel peaks (i.e., reaching the peak output power level) and ensure the maximum power output through maintaining the output voltage at the determined level in real time.

Conventional systems for maximum power output tracking are constructed from a microprocessor, input voltage and current detectors, output voltage and current detectors, a DC-DC power converter, a PWM driver and a maximum power output tracking algorithm. Circuit implementations of these systems are complicated and their maximum power output tracking performance depends on the microprocessor's real-time computation power, the accuracy and frequency of voltage and current detection, the quality of the maximum power output tracking algorithm and its compatibility with the system, and a number of other factors. Moreover, such systems are costly and associated with high circuit complexity and require heavy data processing. All of these limit their applicability, availability and cost competitiveness.

SUMMARY OF THE INVENTION

The present invention provides a switched-mode power supply (SMPS) chip and system, which detect an output current from the SMPS system to an external load (i.e., a sampled current flowing through the external load) and take it as a basis for incrementally adjusting a minimum input voltage of the SMPS chip and hence an output voltage of a solar photovoltaic panel. In this way, an output voltage corresponding to a maximum power output of the solar photovoltaic panel under a given condition can be determined and maintained, ensuring that the solar photovoltaic panel operates with the maximum output power.

In one embodiment of the present invention, there is provided an SMPS chip for determining a maximum power output of a solar photovoltaic panel that is connected to the SMPS chip. The SMPS chip includes a sampled current comparator module, a logic control module coupled to the sampled current comparator module, and a charge/discharge control module coupled to the logic control module. The sampled current comparator module includes a voltage storage member, a comparator coupled to the voltage storage member and a latch coupled to the comparator. A first voltage storage unit in the voltage storage member stores a first voltage within a first period of time. The first voltage corresponds to a first sampled current, which is received by the SMPS chip in the first period of time and flows through an external load. The charge/discharge control module causes an external tracking capacitor to discharge within a second period of time, thereby lowering a minimum input voltage of the SMPS chip from the first input voltage corresponding to the first sampled current to a second input voltage. A second voltage storage unit in the voltage storage member stores a second voltage within a third period of time following the second period of time. The second voltage corresponds to a second sampled current, which is received by the SMPS chip in the third period of time and flows through the external load, and the second sampled current corresponds to the second input voltage. The comparator compares the first voltage with the second voltage within a fourth period of time following the third period of time and responsively outputs a first comparison result to the latch. The latch latches the first comparison result and outputs the latched first comparison result to the logic control module. The logic control module outputs a logic control signal based on the first comparison result to the charge/discharge control module, which then accordingly adjusts the minimum input voltage of the SMPS chip through discharging the external tracking capacitor. If the first voltage is above the second voltage, the logic control module instructs the charge/discharge control module to stop discharging the external tracking capacitor so that the minimum input voltage of the SMPS chip is maintained at the second input voltage and the SMPS chip thus receives the maximum power output from the solar photovoltaic panel.

Additionally, in the SMPS chip, if the first voltage is below the second voltage, a third voltage storage unit in the voltage storage member may store a third voltage within a fifth period of time following the fourth period of time, and the third voltage may be equal to the second voltage.

Additionally, in the SMPS chip, within a sixth period of time following the fifth period of time, the logic control module may instruct the charge/discharge control module to pull the minimum input voltage of the SMPS chip from the second input voltage corresponding to the second sampled current down to a third input voltage.

Additionally, in the SMPS chip, a fourth voltage storage unit in the voltage storage member may store a fourth voltage within a seventh period of time following the sixth period of time. The fourth voltage may correspond to a third sampled current, which is received by the SMPS chip in the seventh period of time and flows through the external load, and the third sampled current may correspond to the third input voltage.

Additionally, in the SMPS chip, the comparator may compare the third voltage with the fourth voltage within an eighth period of time following the seventh period of time and responsively output a second comparison result to the latch. The latch may latch the second comparison result and output the latched second comparison result to the logic control module. The logic control module may output a logic control signal based on the second comparison result to the charge/discharge control module, which may then again adjust the minimum input voltage of the SMPS chip accordingly through discharging the external tracking capacitor.

Additionally, in the SMPS chip, the sampled current comparator module may further include an error amplifier for deriving first, second and third sampled voltages from the first, second and third sampled currents. The first sampled voltage may provide the first voltage to the first voltage storage unit. The second sampled voltage may provide the second and third voltages to the second and third voltage storage units. The third sampled voltage may provide the fourth voltage to the fourth voltage storage unit.

Additionally, in the SMPS chip, in the fifth to eighth periods of time, each of the first and second voltage storage units may be discharged to an initial state.

Additionally, in the SMPS chip, the charge/discharge control module may include a timer constant-current source for causing the external tracking capacitor to discharge to lower the minimum input voltage of the SMPS chip under the control of the logic control signal output from the logic control module in case of the first voltage being below the second voltage.

Additionally, the SMPS chip may further include a timer coupled to the latch in the sampled current comparator module, which is configured to count down a predetermined period of time in which the SMPS chip is maintained at the current minimum input voltage in case of the first voltage being below the second voltage. Finally, upon the expiry of the countdown timer, the SMPS chip may repeat the above process to again perform maximum power output tracking of the solar photovoltaic panel.

Additionally, the voltage storage member may include first, second, third, fourth, fifth, sixth, seventh, eighth, ninth and tenth switches and first, second, third and fourth capacitors, the first capacitor connected in parallel to the second switch, one end of the first capacitor connected in series with one end of the first switch, the other end of the first capacitor grounded, the other end of the first switch coupled to the ninth switch and a first input terminal of the comparator, the third capacitor connected in parallel to the fourth switch, one end of the third capacitor connected in series with one end of the third switch, the other end of the third capacitor grounded, the other end of the third switch coupled to the ninth switch and the first input terminal of the comparator, the second capacitor connected in parallel to the sixth switch, one end of the second capacitor connected in series with one end of the fifth switch, the other end of the second capacitor grounded, the other end of the fifth switch coupled to the tenth switch and a second input terminal of the comparator, the fourth capacitor connected in parallel to the eighth switch, one end of the fourth capacitor connected in series with one end of the seventh switch, the other end of the fourth capacitor grounded, the other end of the seventh switch coupled to the tenth switch and the second input terminal of the comparator.

Additionally, the charge/discharge control module may include a current detector, a switching element and a timer constant-current source, the current detector having a first terminal coupled to the output terminal of the solar photovoltaic panel, a second terminal coupled to the logic control module and third terminal coupled to the timer constant-current source via the switching element.

In embodiments of the present invention, there is also provided an SMPS chip-based system including the SMPS chip as defined in any of the foregoing paragraph. The SMPS chip-based system further includes a tracking capacitor (i.e., the aforementioned external tracking capacitor). A first end of the tracking capacitor is grounded, and a second end of the tracking capacitor is coupled to the timer constant-current source in the charge/discharge control module so that the timer constant-current source is able to cause the tracking capacitor to discharge and thereby lower the minimum input voltage of the SMPS chip.

The provided SMPS chip and system have the advantages of a wide input voltage range, high output power and simple circuitry and is very suitable for use in applications of solar photovoltaic panels that require maximum power output tracking to charge and store energy in a battery pack module. They can detect the output current from the SMPS chip-based system to the output current and take it as a basis for incrementally adjusting the minimum input voltage of the SMPS chip and hence the output voltage of the solar photovoltaic panel. In this way, the solar photovoltaic panel can always operate at a determined output voltage that allows its maximum power output despite possible variation in the time in a day, sunlight illumination angle and illumination intensity.

BRIEF DESCRIPTION OF THE DRAWINGS

The above and other advantages of the present invention will become apparent upon reading the following detailed description of specific embodiments thereof in conjunction with the accompanying drawings, in which:

FIG. 7 is a diagram showing a table that summarizes operating statuses of switches K1-K10, capacitors C1-C4, a comparator and a latch in normal operation of the SMPS chip according to an embodiment of the present invention;

FIG. 8 is a diagram showing a table that summarizes operating statuses of the switches K1-K10, the capacitors C1-C4, the comparator and the latch in critical-state operation of the SMPS chip according to an embodiment of the present invention.

DETAILED DESCRIPTION

The techniques disclosed in embodiments hereof will be described clearly and fully hereunder in conjunction with the appended drawings. Apparently, the embodiments set forth herein are merely some, but not all, of the possible embodiments of this application. Any and all other embodiments devisable by skilled artisans in light of the disclosed embodiments are considered without paying any creative effort are considered to fall within the scope of this application.

As used herein, the terms "installation", "connection" and "coupling" should be interpreted in a broad sense, unless otherwise specified and defined. For example, a connection may be a permanent, detachable or integral connection, or a mechanical, electrical or communicative connection, or a direct or indirect connection with one or more intervening media, or an internal communication or interaction between two components. Those of ordinary skill in the art can understand the specific meanings of the above-mentioned terms herein, depending on their context.

Figure 1:
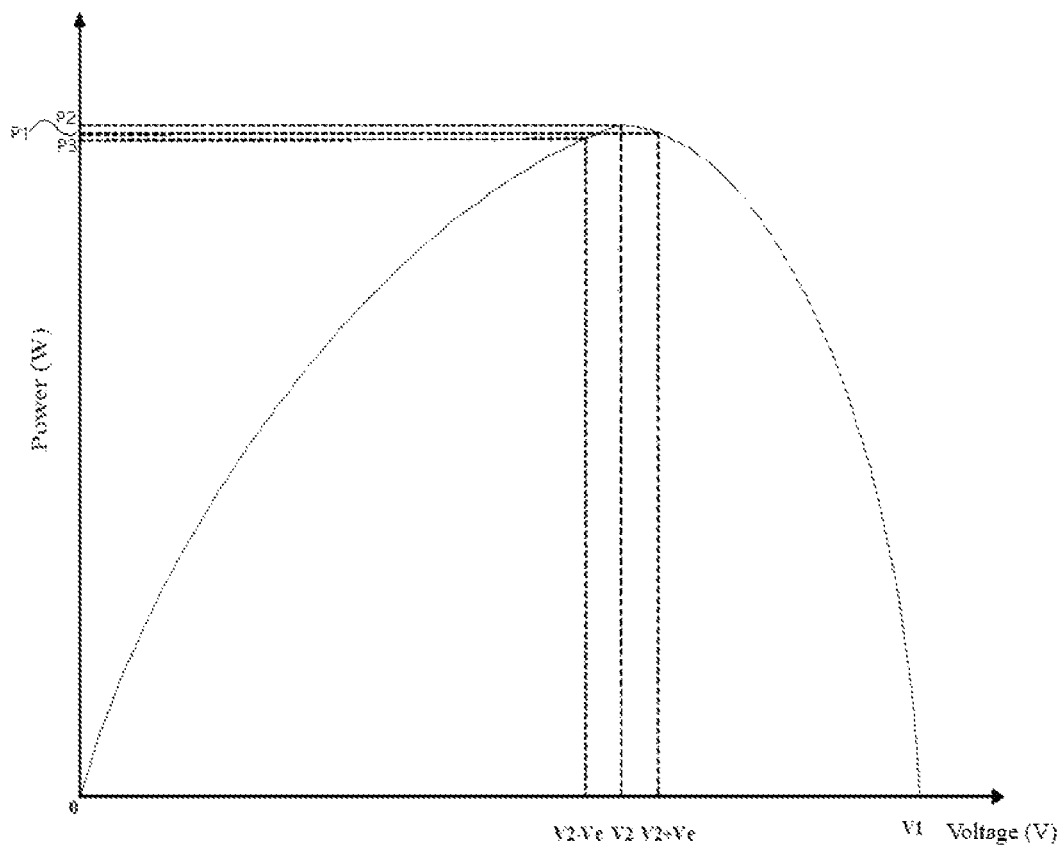
FIG. 1 illustrates the variation of the power output of a solar photovoltaic panel with its output voltage.

Specifically, as shown in FIG. 1, limited by its own operating mechanism, a solar photovoltaic panel is associated with an upper aggregate output power limit as proven by the behavior of its output power versus voltage (P-U) profile. Apart from the sunlight illumination area, angle, intensity and other factors, the maximum power output of a solar photovoltaic panel is also dependent on its output voltage. Specifically, the power output of a solar photovoltaic panel may vary both with time and with its output voltage. In order to cause a solar photovoltaic panel to always operate at its maximum power output and thus achieve full utilization of its photoelectric conversion ability, it may be necessary to perform maximum power output tracking to adapt the solar photovoltaic panel's output voltage to variations in the ambient temperature, sunlight illumination intensity and other external environmental factors in real time.

Figure 2:
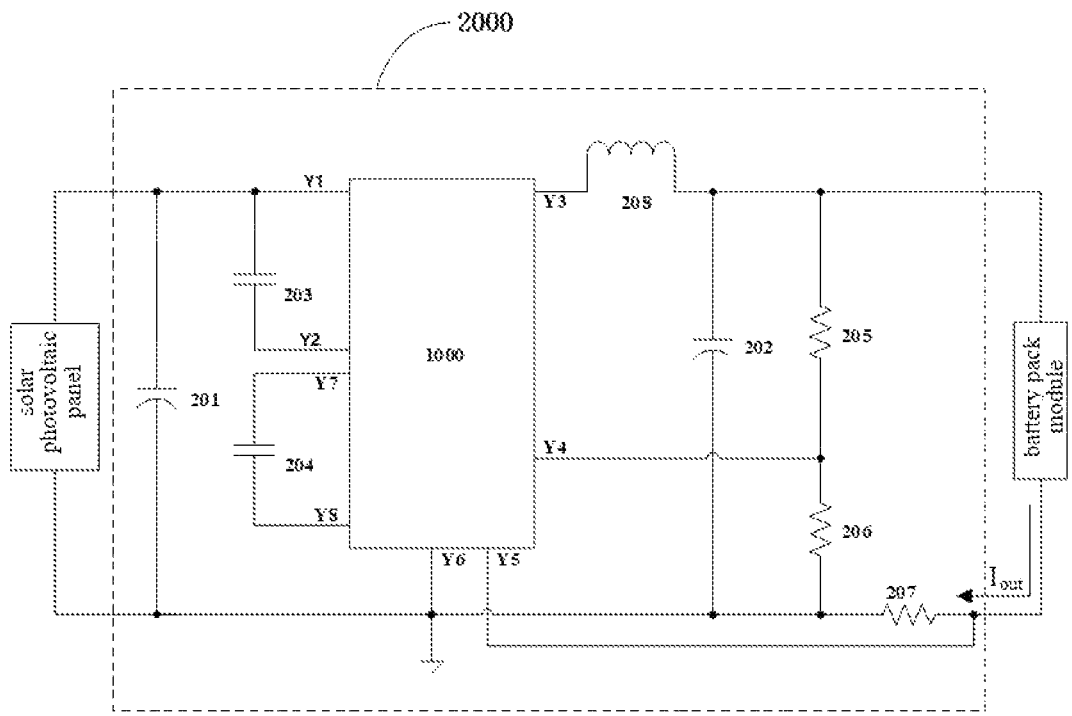
FIG. 2 schematically illustrates the wiring of a switched-mode power supply (SMPS) chip-based system according to an embodiment of the present invention.

Specifically, FIG. 2 shows the wiring of a switched-mode power supply (SMPS) chip-based system 2000 provided in an embodiment of the present invention. As shown in FIG. 2, the SMPS chip-based system 2000 receives power from a solar photovoltaic panel and outputs power to, and thus charges, a battery pack module. Thus, at a maximum output power level of the solar photovoltaic panel to the SMPS chip-based system 2000, the SMPS chip-based system 2000 will provide the battery pack module with output as much as it can.

Specifically, the SMPS chip-based system 2000 includes an SMPS chip 1000 (having pins Y1-Y8), an inductor 208, a capacitor 201, a capacitor 202, a capacitor 203, a capacitor 204, an upper voltage divider resistor 205, a lower voltage divider resistor 206 and an output current sampling resistor 207. The pins Y1-Y8 of the SMPS chip-based system 2000 are used respectively as a power input terminal Y1, a clamp capacitor terminal Y2, a power output terminal Y3, a feedback signal input terminal Y4, a current sampling terminal Y5, a ground terminal Y6, a charging/discharging terminal Y7 for a tracking capacitor and a reference ground terminal Y8 for the tracking capacitor.

Figure 5:
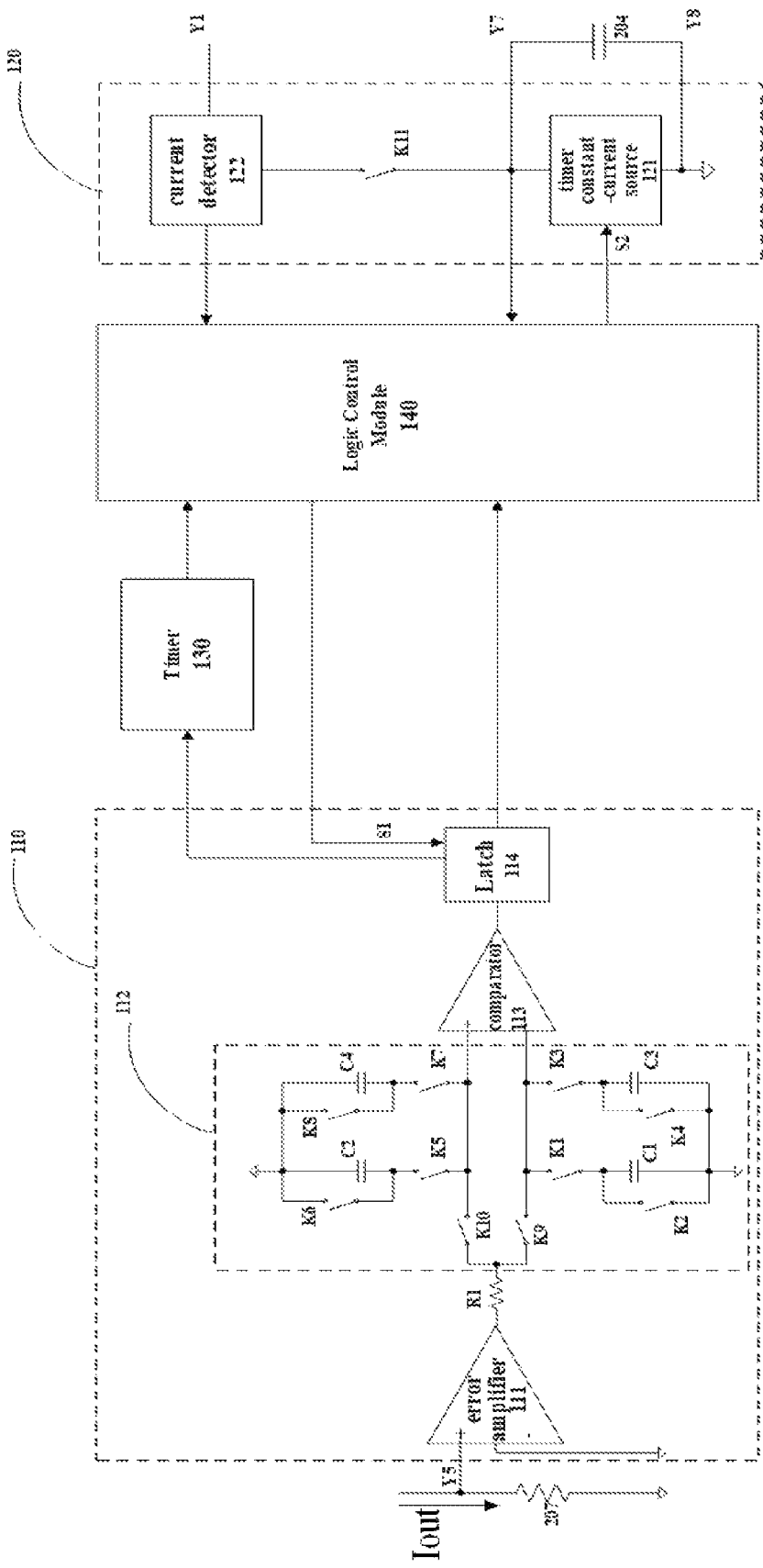
FIG. 5 schematically illustrates exemplary wiring of the sampled current comparator module, a charge/discharge control module, a timer and a logic control module in the SMPS chip according to an embodiment of the present invention.

In this embodiment, the power input terminal Y1 is coupled to the solar photovoltaic panel so as to receive an output voltage of the solar photovoltaic panel. One end of the capacitor 201 is coupled to both the solar photovoltaic panel and the power input terminal Y1, and the other end of the capacitor 201 is grounded. One end of the capacitor 203 is coupled to the power input terminal Y1, and the other end is coupled to the clamp capacitor terminal Y2 so that it provides a gate-to-source drive voltage (VGS) to an internal power transistor (e.g., a p-type metal-oxide-semiconductor (PMOS) transistor, not shown). The power output terminal Y3 is coupled to a first end of the inductor 208, and a second end of the inductor 208 is coupled to one end of the capacitor 202, one end of the upper voltage divider resistor 205 and one end of the battery pack module so as to be able to deliver power to the battery pack module. The other end of the capacitor 202 is grounded. The other end of the upper voltage divider resistor 205 is coupled to one end of the lower voltage divider resistor 206 at a common node that is coupled to the feedback signal input terminal Y4. The other end of the lower voltage divider resistor 206 is grounded. The other end of the battery pack module is coupled to one end of the output current sampling resistor 207 and the current sampling terminal Y5. The output current sampling resistor 207 provides the SMPS chip 1000 with a sampled voltage corresponding to the output current Iout. The other end of the output current sampling resistor 207 is grounded. The ground terminal Y6 provides the SMPS chip-based system 2000 with a reference ground. The reference ground terminal Y8 provides the tracking capacitor 204 with a reference ground and is coupled to one end of the capacitor 204, thus avoiding noise in a high current through the ground terminal Y6 (to the ground) from interfering with the charge/discharge of the capacitor 204 under control of the charge/discharge control module 120 in the SMPS chip 1000 (as shown in FIG. 5). The other end of the capacitor 204 is coupled to the charging/discharging terminal Y7 for the tracking capacitor. The charging/discharging terminal Y7 and the reference ground terminal Y8 may be arranged closer to the capacitor 204 to allow shorter wiring lengths and hence less parasitic capacitance. This can result in more accurate and more reliable constant-current charge/discharge and thus improved maximum power output tracking accuracy of the system.

While the SMPS chip-based system 2000 is shown as a synchronous rectification buck configuration in the embodiment shown in FIG. 2, the SMPS chip-based system 2000 may also be implemented as a synchronous rectification boost configuration with similar maximum power output tracking capabilities in other embodiments, which will not be described in further detail herein.

The SMPS chip-based system 2000 with maximum power output tracking capabilities provided in the above embodiment is designed with the SMPS chip 1000 not operating when energized to allow the solar photovoltaic panel to operate in an idle state to provide a maximum output voltage and starting operating when detecting the maximum output voltage of the solar photovoltaic panel. Since the SMPS chip-based system 2000 provides the battery pack module, i.e., a load thereof, with a constant output voltage (which is determined by an operating voltage of the load), the power output of the SMPS chip-based system 2000 can be determined simply by measuring an output current Iout from the SMPS chip-based system 2000 to the battery pack module. In this way, under a given environmental condition, the power outputs of both the SMPS chip-based system 2000 and the solar photovoltaic panel peak at the same time as the output current Iout peaks. Specifically, through detecting the output current Iout from the SMPS chip-based system 2000 to the battery pack module, a minimum input voltage to the SMPS chip 1000 may be incrementally reduced so that the output voltage from the solar photovoltaic panel is incrementally lowered from the idle-state maximum level to a desired level corresponding to its maximum power output. From then on, the desired output voltage level of the solar photovoltaic panel is maintained to cause the solar photovoltaic panel to keep providing the maximum power output. In addition, the SMPS chip 1000 re-determines and updates the maximum power output of the solar photovoltaic panel at regular intervals. In this way, the SMPS chip 1000 can automatically ensure in real time that the solar photovoltaic panel operates at its maximum power output in various environments and at different times.

The SMPS chip-based system 2000 with maximum power output tracking capabilities provided in the above embodiment is designed with the SMPS chip 1000 not operating (thus minimizing energy loss) as soon as it is energized when the input voltage is the maximum output voltage of the solar photovoltaic panel that is being in an idle state. Referring to FIG. 1, the power output of the solar photovoltaic panel does not peak at the maximum output voltage V1. At this point, the SMPS chip 1000 automatically lowers its minimum input voltage to reduce the output voltage of the solar photovoltaic panel. This is accomplished because an output terminal of the solar photovoltaic panel is coupled to an input terminal of the SMPS chip 1000 (which is also an input terminal of the SMPS chip-based system 2000, as shown in FIG. 2), and the SMPS chip 1000 is so configured that if the power output of the solar photovoltaic panel is lower than its maximum power output, then the SMPS chip 1000 will automatically adjust its own minimum permissible input voltage to always maintain the output voltage of the solar photovoltaic at the same level as the minimum input voltage of the SMPS chip 1000. Specifically, incrementally lowering the minimum input voltage of the SMPS chip 1000 will lead to incremental lowering of the output voltage of the solar photovoltaic panel and incremental increasing of each of the output power of the solar photovoltaic panel, input power to the SMPS chip 1000 and output power of the SMPS chip 1000. At the same time, since the output voltage from the SMPS chip-based system 2000 to the battery pack module remains the same, the output current Iout as detected by the SMPS chip 1000 will incrementally increase. It would be appreciated that, under a given condition, the power outputs of both the solar photovoltaic panel and the SMPS chip 1000 peak at the same time as the output current Iout detected by the SMPS chip 1000 peaks. Therefore, as detected by the SMPS chip 1000, once the output current Iout turns from rising at a positive slope to falling at a negative slope, the turning point can be identified as where the maximum power output of the SMPS chip 1000, and thus that of the solar photovoltaic panel, under the given environmental condition is reached. In response, the SMPS chip 1000 controls its internal circuitry to maintain the minimum input voltage and thus the output voltage and maximum power output of the solar photovoltaic panel. In order to cope with any possible shift of the maximum power output thereafter due to variation in the sunlight illumination intensity, illumination angle or another environmental factor, the SMPS chip 1000 may repeat the above process upon the expiry and resetting of a countdown timer that was started at the time of identifying the maximum output power. As a result, a new maximum power output is determined for the next period time interval. In this way, through re-determining and updating the maximum power output of the solar photovoltaic panel at regular intervals, it can be ensured that the solar photovoltaic panel always provides power as much as it can.

Figure 3:
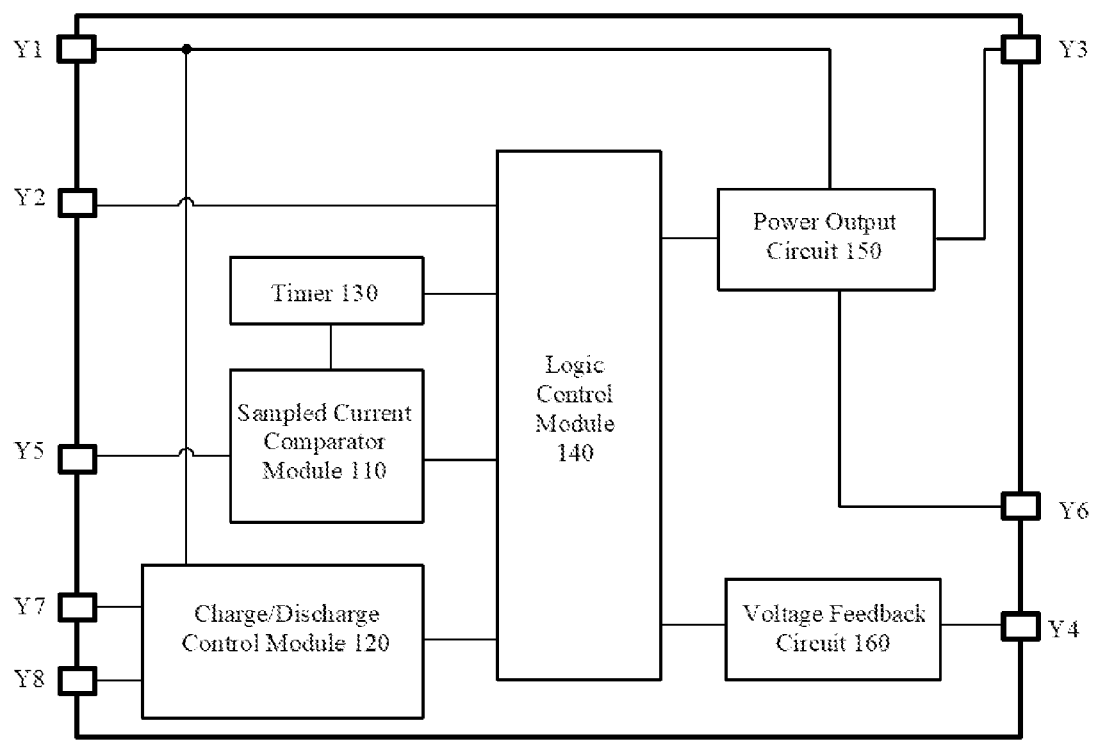
FIG. 3 is a structural schematic of an SMPS chip according to an embodiment of the present invention.

FIG. 3 schematically illustrates the structure of the SMPS chip 1000 according to an embodiment of the present invention. The SMPS chip 1000 includes a sampled current comparator module 110, a charge/discharge control module 120, a timer 130, a logic control module 140, a power output circuit 150 and a voltage feedback circuit 160. The sampled current comparator module 110 is coupled to each of the current sampling terminal Y5, the logic control module 140 and the timer 130. The charge/discharge control module 120 is coupled to each of the power input terminal Y1, charging/discharging terminal Y7 for the tracking capacitor, the reference ground terminal Y8 for the tracking capacitor and the logic control module 140. The timer 130 is coupled to both the sampled current comparator module 110 and the logic control module 140. The logic control module 140 is coupled to each of the sampled current comparator module 110, the charge/discharge control module 120, the timer 130, the power output circuit 150 and the voltage feedback circuit 160. The power output circuit 150 is coupled to each of the logic control module 140, the power input terminal Y1, the power output terminal Y3 and the ground terminal Y6. The voltage feedback circuit 160 is coupled to both the logic control module 140 and the feedback signal input terminal Y4.

Figure 4:
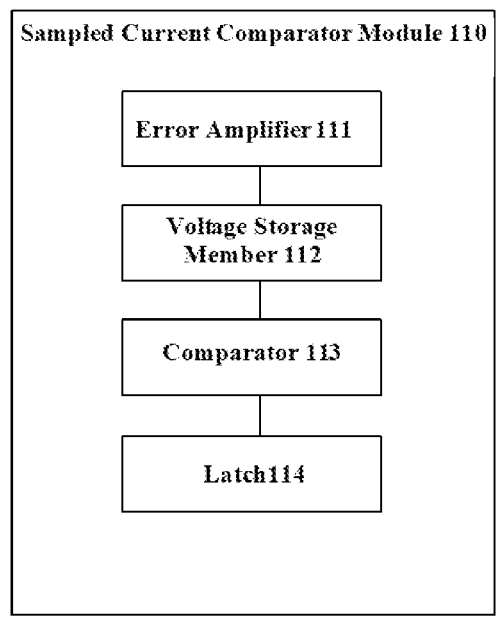
FIG. 4 is a structural schematic of a sampled current comparator module in the SMPS chip according to an embodiment of the present invention.

FIG. 4 schematically illustrates the structure of the sampled current comparator module 110 in the SMPS chip 1000 according to an embodiment of the present invention. FIG. 5 schematically illustrates exemplary wiring of the sampled current comparator module 110, the charge/discharge control module 120, the timer 130 and the logic control module 140 in the SMPS chip 1000 according to an embodiment of the present invention.

In the embodiment, as shown in FIGS. 4 and 5, the sampled current comparator module 110 includes an error amplifier 111, a voltage storage member 112 coupled to the error amplifier 111, a comparator 113 coupled to the voltage storage member 112 and a latch 114 coupled to the comparator 113. Specifically, the sampled current comparator module 110 further includes a resistor R1. The voltage storage member 112 includes switches K1-K10 and capacitors C1-C4. The error amplifier 111 has a first input terminal coupled to the current sampling terminal Y5, a grounded second input terminal, and an output terminal coupled to one end of the resistor R1. The other end of the resistor R1 is coupled to both the switches K10 and K9. The capacitor C1 is connected in parallel to the switch K2. One end of the capacitor C1 is connected in series with one end of the switch K1, and the other end of the capacitor C1 is grounded. The other end of the switch K1 is coupled to the switch K9 and a first input terminal of the comparator 113. The capacitor C3 is connected in parallel to the switch K4. One end of the capacitor C3 is connected in series with one end of the switch K3, and the other end of the capacitor C3 is grounded. The other end of the switch K3 is coupled to the switch K9 and the first input terminal of the comparator 113. Likewise, the capacitor C2 is connected in parallel to the switch K6. One end of the capacitor C2 is connected in series with one end of the switch K5, and the other end of the capacitor C2 is grounded. The other end of the switch K5 is coupled to the switch K10 and a second input terminal of the comparator 113. The capacitor C4 is connected in parallel to the switch K8. One end of the capacitor C4 is connected in series with one end of the switch K7, and the other end of the capacitor C4 is grounded. The other end of the switch K7 is coupled to the switch K10 and the second input terminal of the comparator 113. The output terminal of the comparator 113 is coupled to a first terminal of the latch 114. A second terminal of the latch 114 is coupled to a first end of the timer 130. A second end of the timer 130 is coupled to the logic control module 140. A third terminal of the latch 114 is configured to receive an enable signal S1 from the logic control module 140, and a fourth terminal of the latch 114 is configured to output a comparison result to the logic control module 140. The charge/discharge control module 120 includes a current detector 122, a switch K11 and a timer constant-current source 121. A first terminal of the current detector 122 is coupled to the power input terminal Y1, which is in turn coupled to the output terminal of the solar photovoltaic panel. A second terminal of the current detector 122 is coupled to the logic control module 140, and a third terminal of the current detector 122 is coupled to the timer constant-current source 121 via the switch K11. The logic control module 140 is configured to output an enable signal S2 to the timer constant-current source 121, and the timer constant-current source 121 is connected in parallel to the capacitor 204 (as shown in FIG. 2) to control discharge of the capacitor 204. A minimum input voltage setter (not shown) in the logic control module 140 is configured to receive a voltage on the capacitor 204 at the current time instant and configure it as a minimum input voltage of the SMPS chip 1000 for the current time instant. In response, the SMPS chip 1000 pulls the output voltage of the solar panel down to the minimum input voltage for the current time instant and provides the output voltage of the solar panel to the power output circuit 150 (as shown in FIG. 3), which then performs power conversion and outputs the converted power to the external load (i.e., the battery pack module shown in FIG. 2). Further, in this embodiment, the switch K11 is implemented as a PMOS transistor. It should be understood that the switch K11 may also be implemented as another electronic switching element with closing and opening capabilities.

In this embodiment, the sampled current comparator module 110 in the SMPS chip 1000 adjusts the minimum input voltage of the SMPS chip 1000 in real time through causing the capacitor 204 (as shown in FIG. 2) to discharge and thus changing the voltage thereon. As a result, the output voltage of the solar photovoltaic panel responsively drops to the minimum permissible input voltage of the SMPS chip 1000 that corresponds to the maximum power output.

Specifically, in this embodiment, referring to FIGS. 2 to 5, a first voltage storage unit (capacitor C1) in the voltage storage member 112 stores a first voltage Vc1 within a first period of time. The first voltage Vc1 corresponds to a first sampled current Iout1, which is received by the SMPS chip 1000 in the first period of time and flows through the external load (i.e., the battery pack module of FIG. 2). The charge/discharge control module 120 causes the capacitor 204 to discharge within a second period of time, thereby reducing the minimum input voltage of the SMPS chip 1000 from a first input voltage Vin1 corresponding to the first sampled current Iout1 to a second input voltage Vin2. A second voltage storage unit (capacitor C2) in the voltage storage member 112 stores a second voltage Vc2 within a third period of time following the second period of time. The second voltage Vc2 corresponds to second sampled current Iout2, which is received by the SMPS chip 1000 in the third period of time and flows through the external load, and the second sampled current Iout2 corresponds to the second input voltage Vin2. The comparator 113 compares the first voltage Vc1 with the second voltage Vc2 in a fourth period of time following the third period of time, and outputs a first comparison result to the latch 114. The latch 114 latches the first comparison result and outputs the latched first comparison result to the logic control module 140. The logic control module 140 outputs a logic control signal based on the first comparison result to the charge/discharge control module 120, which then accordingly adjusts the minimum input voltage of the SMPS chip 1000 by discharging the capacitor 204. When the first voltage Vc1 is above the second voltage Vc2, the logic control module 140 instructs the charge/discharge control module 120 to stop discharging the capacitor 204 so that the minimum input voltage of the SMPS chip 1000 is maintained at the second input voltage Vin2 and the SMPS chip 1000 thus receives the maximum power output P2 (as shown in FIG. 1) from the solar photovoltaic panel.

If the first voltage Vc1 is below the second voltage Vc2, a third voltage storage unit (capacitor C3) in the voltage storage member 112 stores a third voltage Vc3 within a fifth period of time following the fourth period of time. The third voltage Vc3 is equal to the second voltage Vc2, and the second voltage Vc2 corresponds to a second sampled current Iout2, which is received by the SMPS chip 1000 in the third period of time and flows through the external load. Within a sixth period of time following the fifth period of time, the logic control module 140 instructs the charge/discharge control module 120 pull the minimum input voltage of the SMPS chip 1000 from the second input voltage Vin2 corresponding to the second sampled current Iout2 down to a third input voltage Vin3. Within a seventh period of time following the sixth period of time, a fourth voltage storage unit (capacitor C4) in the voltage storage member 112 stores a fourth voltage Vc4, which corresponds to a third sampled current Iout3 received by the SMPS chip 1000 in the seventh period of time and flows through the external load, and the third sampled current Iout3 corresponds to the third input voltage Vin3. Within an eighth period of time following the seventh period of time, the comparator compares the third voltage Vc3 with the fourth voltage Vc4, and outputs a second comparison result to the latch 114, and the latch 114 then latches the second comparison result and outputs the latched second comparison result to the logic control module 140. The logic control module 140 outputs a logic control signal based on the second comparison result to the charge/discharge control module 120, the charge/discharge control module 120 then again adjusts the minimum input voltage of the SMPS chip 1000 accordingly through discharging the capacitor 204. If the third voltage Vc3 is below the fourth voltage Vc4, the logic control module 140 instructs the charge/discharge control module 120 to further pull down the minimum input voltage of the SMPS chip 1000. Otherwise, if the third voltage Vc3 is above the fourth voltage Vc4, the logic control module 140 instructs the charge/discharge control module 120 to stop discharging the capacitor 204 so that the minimum input voltage is not further lowered and is maintained.

In this embodiment, the sampled current comparator module 110 further includes the error amplifier 111, the error amplifier 111 derives the first sampled voltage Vout1, the second sampled voltage Vout2 and the third sampled voltage Vout3 from the first sampled current Iout1, the second sampled current Iout2 and the third sampled current Iout3. The first sampled voltage Vout1 provides the first voltage Vc1 to the first voltage storage unit. The second sampled voltage Vout2 provides the second voltage Vc2 and the third voltage Vc3 to the second voltage storage unit and the third voltage storage unit. The third sampled voltage Vout3 provides the fourth voltage Vc4 to the fourth voltage storage unit.

In this embodiment, in the fifth to eighth periods of time, each of the first and second voltage storage units are discharged to an initial state.

In this embodiment, the SMPS chip 1000 further includes the timer 130 which is coupled to the latch 114 in the sampled current comparator module 110. In case of the first voltage Vc1 being higher than the second voltage Vc2, or in case of the third voltage Vc3 being higher than the fourth voltage Vc4, the timer 130 starts counting down a predetermined period of time in which the SMPS chip 1000 is maintained at the current minimum input voltage.

The SMPS chip provided in embodiments of the present invention detects the output current from the SMPS system to the external load and takes it as basis for incrementally adjusting the minimum input voltage of the SMPS chip and thus the output voltage of the solar photovoltaic panel. Moreover, upon detecting a turning point of the output current, it is determined that the solar photovoltaic panel has reached the maximum power output under the current condition. In this way, the chip is locked at the current minimum input voltage, and the solar photovoltaic panel is kept at the output voltage corresponding to the maximum power output thereof under the current condition.

Additionally, the SMPS chip provided in embodiments of the present invention is able to fix the voltage at the input terminal at a desired value (i.e., the minimum input voltage), avoiding the input terminal voltage from dropping down due to insufficient power at the input terminal. For conventional power supply chips, when the power at the input terminal is not enough to meet the demand of the load at the output terminal, the voltage at the input terminal will decrease. For example, in such a situation, the input terminal voltage of a buck-type SMPS chip may be pulled down to a level slightly higher than the output terminal voltage, and the input terminal voltage of a boost-type SMPS chip may be pulled down to a level below the lowest permissible operating voltage. When this happens, none of the conventional system can operate normally.

Structural and functional details of the various modules in the SMPS chip 1000 will be set forth below with reference to FIGS. 5 to 9.

Figure 6:
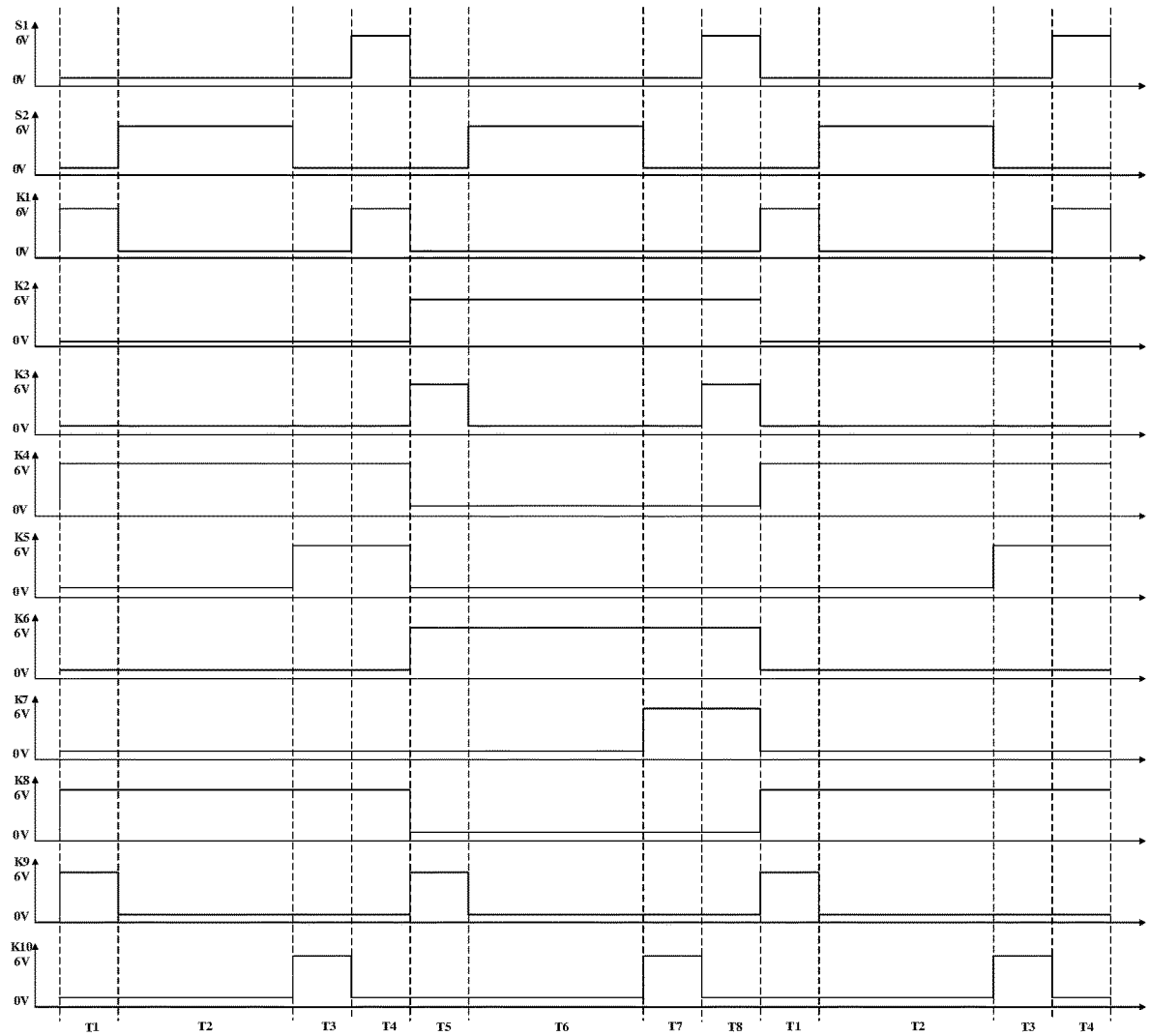
FIG. 6 shows a timing diagram of logic control signals output by the logic control module in normal operation of the SMPS chip according to an embodiment of the present invention.

FIG. 6 shows a timing diagram of logic control signals output by the logic control module 140 in normal operation (not close to the maximum power output) of the SMPS chip 1000. As shown in FIG. 6, the logic control signals can close and open the switches K1-K10 and include the aforementioned logic control signals S1 and S2 for controlling the latch 114 and the timer constant-current source 121 (as shown in FIG. 5). Working principles and steps in normal operation (not close to the maximum power output) of the SMPS chip 1000 will be detailed below with combined reference to FIGS. 5 and 6.

In Step 1, the charge/discharge control module 120 is powered up, and the switch K11 is closed. Moreover, the latch 114 is powered up and reset, and the latch 114 latches a high-level output signal, thus starting charging the capacitor 204. When the current detector 122 detecting a charging current of 0, it is considered that a voltage on the capacitor 204 reaches an output open-circuit voltage V1 of the solar photovoltaic panel (see FIG. 1).

In Step 2, the switch K11 of the charge/discharge control module 120 is opened, and the logic control module 140 starts performing operations in the time periods T1-T4 as shown in FIG. 6. When detecting that the output signal latched in the latch 114 (i.e., a comparison result from the comparator 113) is high, the logic control module 140 transfers an output sampled current Iout1 in the form of a voltage to the sampled current comparator module 110 in the SMPS chip 1000 and charges the capacitor C1 at the voltage within the period T1. As a result, a voltage Vc1 is present on the capacitor C1.

In Step 3, in the period T2, the logic control module 140 enables the timer constant-current source 121 with the output signal S2 (high at this point) so that the timer constant-current source 121 discharges the capacitor 204 throughout the period T2, pulling the voltage thereon down to V1−I0*T2/C0, where V1 represents the output open-circuit voltage of the solar photovoltaic panel, I0 is a preset discharge current, the period T2 is a preset discharge period of time, and C0 is the capacitance of the capacitor 204.

In Step 4, the charge/discharge control module 120 transfers the resulting voltage on the capacitor 204 to the minimum input voltage setter (not shown) in the logic control module 140 so that the minimum permissible input voltage of the SMPS chip 1000 is fixed to the voltage on the capacitor 204. In other words, the minimum input voltage of the SMPS chip 1000 is changed to the voltage on the capacitor 204. The change in the minimum input voltage of the SMPS chip 1000 pulls the output voltage of the solar photovoltaic panel from the maximum voltage V1 down to the voltage on the capacitor 204 (V1−I0*T2/C0). As a result, the solar photovoltaic panel outputs more power (as shown in FIG. 1). At the same time, since the output voltage of the SMPS chip 1000 remains the same, the output current Iout increases.

In Step 5, the output current Iout2 is sampled, and the obtained sampled current is transferred in the form of a voltage to the sampled current comparator module 110 of the SMPS chip 1000 in T3. In response, the capacitor C2 is charged at the voltage throughout the period T3. As a result, a voltage Vc2 is present on the capacitor C2.

In Step 6, in the period T4, the sampled current comparator module 110 draws a comparison. If Vc1 on the capacitor C1 is lower than Vc2 on the capacitor C2, the comparator 113 outputs a high level. The logic control module 140 then enables the latch 114 with the high-level output signal S1, and the enabled latch 114 then receives and latches the high level from the comparator 113.

In Step 7, following the comparison performed in the period T4, the logic control module 140 starts performing operations in the time periods T5-T8. In the period T5, the capacitors C1 and C2 are discharged. The capacitor C4 is restored to an initial capacitance value, and the capacitor C3 is charged to Vc3 that is equal to Vc2 on the capacitor C2 in the period T3.

In Step 8, in T6, when enabled by the high-level output signal S2 from the logic control module 140, the timer constant-current source 121 discharges the capacitor 204 throughout T6, pulling the voltage on the capacitor 204 down to V1−I0*T2/C0−I0*T6/C0. This is referred to as the second discharge period. If it is configured that each discharge period lasts for an equal length of time (e.g., T6=T2), then the voltage on the capacitor 204 will be V1−n*I0*T2/C0 after the n-th discharge period.

In Step 9, similar to the operations in Step 4, the charge/discharge control module 120 transfers the resulting voltage on the capacitor 204 to the minimum input voltage setter (not shown) in the logic control module 140 so that the minimum permissible input voltage of the SMPS chip 1000 is again fixed to the voltage on the capacitor 204. In other words, the minimum input voltage of the SMPS chip 1000 is again changed to the voltage on the capacitor 204. The change in the minimum input voltage of the SMPS chip 1000 pulls the output voltage of the solar photovoltaic panel from (V1−I0*T2/C0) further down to (V1−I0*T2/C0−I0*T6/C0). As a result, the solar photovoltaic panel outputs more power. At the same time, since the output voltage of the SMPS chip 1000 remains the same, the output current Iout further increases.

In Step 10, the output current Iout3 is sampled, and the obtained sampled current is transferred in the form of a voltage to the sampled current comparator module 110 of the SMPS chip 1000. In response, the capacitor C4 is charged at the voltage in the period T7. As a result, a voltage Vc4 is present on the capacitor C4.

In Step 11, in T8, the sampled current comparator module 110 draws a comparison. If Vc3 on the capacitor C3 is lower than Vc4 on the capacitor C4, the comparator 113 outputs a high level. The logic control module 140 then enables the latch 114 with the high-level output signal S1, and the enabled latch 114 then receives and latches the high level from the comparator 113.

In Step 12, the operations in T1-T8 are repeated until a turning point of the output current Iout is reached. When detecting a decrease in the output current Iout, reflected by the voltage on the capacitor C1 being higher than the voltage on the capacitor C2, or by the voltage on the capacitor C3 being higher than the voltage on the capacitor C4, the comparator 113 outputs a low level, and the latch 114 is enabled with the high-level output signal S1 from the logic control module 140 to receive and latch the low-level signal from the comparator 113. Additionally, the latch provides the low-level signal to the logic control module 140. Upon receiving the low-level signal, the logic control module 140 outputs the signal S2 (low at this point) to instruct the timer constant-current source 121 to maintain the current voltage on the capacitor 204 by stopping discharging the capacitor 204. At the same time, the timer 130 starts a countdown. As a result, the SMPS chip 1000 does nothing to the minimum input voltage, and the output voltage of the solar photovoltaic panel is maintained at the current minimum input voltage to allow the solar photovoltaic panel to operate at its maximum power output.

In Step 13, upon expiry of the countdown timer, a signal indicative of the expiry is provided to the logic control module 140. In response, the logic control module 140 causes the SMPS chip 1000 to crease the current operation and start repeating Steps 1 to 12 to again track the maximum power output of the solar photovoltaic panel.

With continued reference to FIG. 6, in this embodiment, in the periods T1-T8, each of the switches K1-K10 is closed when receiving a high logic level (e.g., 6V) from the logic control module 140, and is opened when receiving a low logic level (e.g., close to 0V) therefrom.

In the period T1, the switches K1, K4, K8 and K9 are closed, and the switches K3, K2, K5, K6, K7 and K10 are opened. The capacitor C1 stores the voltage Vc1 corresponding to the sampled current in the last T7 period. As discussed above, the sampled current is transferred in the form of a voltage to the error amplifier 111 in the sampled current comparator module 110, and the voltage is then amplified by the error amplifier 111 and used to charge the capacitor C1.

In the period T2, the switches K4 and K8 are closed, and the switches K1, K2, K3, K5, K6, K7, K9 and K10 are opened. The timer constant-current source 121 is enabled by the enable signal S2 (high at this point) output from the logic control module 140 and discharges the capacitor 204 for a time length of T2. In this embodiment, the periods T2 and T6 are equally long.

In the period T3, the switches K4, K5, K8 and K10 are closed, and the switches K1, K2, K3, K6, K7 and K9 are opened. The capacitor C2 stores the voltage Vc2 corresponding to the current output current of the SMPS chip-based system (i.e., the aforesaid sampled current). As discussed above, once the SMPS chip 1000 is powered up, the capacitor 204 starts being charged. After the capacitor 204 is fully charged, the SMPS chip 1000 starts operating, and the logic control module 140 is forced to output the enable signal S2 (high at this point) to the timer constant-current source 121. In this way, the capacitor 204 experiences the first discharge period, allowing sampling of the sampled current comparator module 110.

In the period T4, the switches K1, K4, K5 and K8 are closed, and the switches K2, K3, K6, K7, K9 and K10 are opened. The comparator 113 compares the voltage Vc1 on the capacitor C1 with the voltage Vc2 on the capacitor C2. If Vc2 on the capacitor C2 is higher than Vc1 on the capacitor C1, the comparator 113 outputs a high level, and the enable signal S1 from the logic control module 140 turns high, thereby enabling the latch 114 to allow it to receive the high level from the comparator 113.

In the period T5, the switches K2, K3, K6 and K9 are closed, and the switches K1, K4, K5, K7, K8 and K10 are opened. The capacitor C3 stores the voltage Vc3 corresponding to the current output current of the SMPS chip-based system. Since the capacitor 204 is not discharged in the periods T3-T5, the output sampled current of the SMPS chip-based system in the period T5 is equal to that in the period T3. Therefore, the voltage Vc3 on the capacitor C3 is equal to the voltage Vc2 on the capacitor C2 in the period T3. As a result, the sampled voltage by the inverting input terminal of the comparator 113 in T5 corresponds to the sampled current in the period T3.

In the period T6, the switch K2 and K6 are closed, and the switches K1, K3, K4, K5, K7, K8, K9 and K10 are opened. The timer constant-current source 121 is enabled by the enable signal S2 (high at this point) from the logic control module 140 and discharges capacitor 204 throughout T6.

In the period T7, the switches K2, K6, K7 and K10 are closed, and the switches K1, K3, K4, K5, K8 and K9 are opened. The capacitor C4 stores the voltage Vc4 corresponding to the current output current of the SMPS chip-based system.

In the period T8, the switches K2, K3, K6 and K7 are closed, and the switches K1, K4, K5, K8, K9 and K10 are opened. The comparator 113 compares the voltage Vc3 on the capacitor C3 and the voltage Vc4 on the capacitor C4. If Vc4 is higher than Vc3, the comparator 113 outputs a high level, and the enable signal S1 from the logic control module 140 turns high, thereby enabling the latch 114 to allow it to receive the high level from the comparator 113.

The voltage Vc1 corresponding to the current output current of the SMPS chip-based system is stored on the capacitor C1 in the next T1 period and is also equal to the voltage Vc4 corresponding to the output current of the SMPS chip-based system in the last T7 period.

The above process is repeated, and whenever the comparator 113 outputs a low level in the period T4 or T8, it is determined that the output current from the SMPS system output to the load (i.e., the battery pack module) will not continue increasing but start decreasing. In response to the low level from the comparator 113, the logic control module 140 is logically configured to pull the output enable signal S1 high to enable the latch 114 to allow it receive and latch the low level from the comparator 113. After that, the latch 114 transmits the received low-level signal to the logic control module 140. As a result, in the subsequent discharge period (T2 or T6), the enable signal S2 output from the logic control module 140 is low, causing the timer constant-current source 121 stop discharging the capacitor 204. Consequently, the voltage on the capacitor 204 is fixed, and the SMPS chip 1000 no longer decreases the chip minimum input voltage. Thus, the minimum permissible input voltage of the SMPS chip 1000, and hence the output voltage of the solar photovoltaic panel, is maintained. At this point, the timer 130 starts a countdown. Upon expiry of the timer 130, a signal indicating the expiry is provided to the logic control module 140, and the logic control module 140 responsively creases the operation of the SMPS chip 1000 and starts repeating the above steps to again track the maximum power output of the solar photovoltaic panel.

As described above, the output of the comparator 113 transitions from high to low when the output current from the SMPS chip 1000 to the external load (battery pack module) starts decreasing. Specifically, referring again to FIG. 1, when the minimum input voltage of the SMPS chip 1000 is lowered from V1 to V2, the solar photovoltaic panel achieves the maximum power output. When the minimum input voltage of the SMPS chip is further reduced to V2−Ve (Ve=I0*T2/C0), the power output P3 of the solar photovoltaic panel is lower than P2, and the sampled current comparator module 110 will detect a negative slope of the output current Iout from the SMPS system. Responsively, the comparator 113 outputs a low level, and the SMPS chip 1000 fixes the minimum input voltage to V2−Ve. At this time, the output voltage of the solar photovoltaic panel is also equal to V2−Ve. Since the magnitude of Ve is extremely small, V2−Ve can be seen as being infinitely close to V2. Therefore, it can be considered that the solar photovoltaic panel has reaches its maximum power output. Accordingly, the timer 130 is reset and starts a countdown, and the above process is repeated after the expiry of the countdown timer.

In this embodiment, the capacitors C1-C4 impart double buffering capabilities to the voltage storage member 112 in the sampled current comparator module 110. Specifically, the capacitors C1 and C2 are charged, and the capacitors C3 and C4 are discharged, in the first half cycle T1-T4. Additionally, the capacitors C3 and C4 are charged, and the capacitors C1 and C2 are discharged, in the second half cycle. In this way, in each cycle, the capacitors are restored to the same initial value (e.g., close to zero). Further, each of the four capacitors C1-C4 is charged for a duration of time t that is far shorter than T1 (T1=T3=T5=T7). This ensures that a resulting voltage on each charged capacitor is close to the output voltage of the error amplifier and can reflect true variation in the output current from the SMPS chip to the external load (battery pack module).

Corresponding to the timing diagram of FIG. 6, FIG. 7 is a diagram showing a table that summarizes operating statuses of the switches K1-K10, the capacitors C1-C4, the comparator 113, the latch 114 and the enable signals S1 and S2 in the cycle T1-T8 in normal operation of the SMPS chip 1000.

In this embodiment, as shown in FIG. 7, the latch 114 is enabled by the signal S1 from the logic control module 140 in T4 and T8. In each of the other periods, it does not receive any signal input and continues the operating status of the last period. In other words, in the periods T4 and T8 when the enable signal S1 is high, the latch 114 receives the comparison result from the comparator 113. Further, in the periods T2 and T6 when the logic control module 140 outputs the high-level enable signal S2 according to the high-level signal output from the latch 114, the timer constant-current source 121 is enabled to discharge the capacitor 204.

In this embodiment, the charging of the capacitors C1-C4 can be described as:

$$V_C = V_{ea} \times (1 - e^{-t/(R \times C)})$$

where Vc is the voltage on the charged capacitors C1-C4, Vea is the form of the sampled voltage corresponding to the sampled current, which has been amplified by the error amplifier 111, t is the duration of time that the charging lasts for, R is the resistance of the resistor R1 (as shown in FIG. 5), and C is the capacitance of the capacitors C1-C4.

In this embodiment, the charging duration t of the capacitors C1-C4 is approximately 5*R*C. As described above, in order to impart double buffering capacities to the capacitors C1-C4, the charging duration t (i.e., t=5*R*C) is configured to be much shorter than T1 (T1=T3=T5=T7) so as to ensure that the resulting voltage of each charge capacitor is close to the voltage amplified by the error amplifier to reflect variation in the output current from the SMPS chip output to the external load.

FIG. 8 is a diagram showing a table that summarizes operating statuses of the switches K1-K10, the capacitors C1-C4, the comparator 113, the latch 114 and the enable signals S1 and S2 in the cycle T1-T8 in critical-state operation (close to the maximum power output) of the SMPS chip 1000.

In this embodiment, if each discharge period is configured to be equally long (e.g., T6=T2), then after the n-th discharge period, the voltage on the capacitor 204 will be V1−n*I0*T2/C0, i.e., V2 in FIG. 1. When the voltage on the capacitor 204 reaches V2+Ve (Ve=I0*T2/C0) corresponding to the output power level P1 of the solar photovoltaic panel, as shown in FIG. 1, the voltage on the capacitor 204 will become V2 corresponding to the output power level P2 if the capacitor is discharged at a constant current I0 for a time duration of T2. As shown in FIG. 1, P2 is greater than P1. It is thus known that the output current from the SMPS chip-based system to the load is still increasing, and the capacitor 204 is still being discharged to further reduce the minimum input voltage of the SMPS chip 1000 and hence the output voltage of the solar photovoltaic panel.

As shown in FIG. 8, after the capacitor 204 is further discharged for a period of T6 at the constant current J0, if it is detected that the voltage Vc3 on the capacitor C3 is higher than the voltage Vc4 on the capacitor C4, e.g., in the period T8, then the comparator 113 outputs a low level, which is then received, latched and passed on to the logic control module 140 by the latch 114. At this point, the voltage on the capacitor 204 is V2−I0*T6/C0 (T2=T6), i.e., the minimum input voltage of the SMPS chip 1000 is set to V2−Ve, corresponding to an output power level P3 of the solar photovoltaic panel. As can be seen from the profile in FIG. 1, P3<P2. Thus, it is known that the output current from the SMPS chip-based system to the load starts decreasing. Responsively, the logic control module 140 causes the timer constant-current source 121 to stop discharging the capacitor 204 so that the SMPS chip 1000 locks the minimum input voltage to the voltage V2−Ve on the capacitor 204 and the output voltage of the solar photovoltaic panel is thus clamped at V2−Ve. At the same time, since the input power is constant, the output power is also constant. Thus, the output current from the SMPS system to the load does not change anymore. It would be appreciated that although the capacitor 204 clamps the voltage of the solar photovoltaic panel at V2−Ve that is different from the output voltage V2 corresponding to the maximum power output, as Ve is very small, V2−Ve can be seen as being approximately equal to V2, and the solar photovoltaic panel can be considered as operating at its maximum power output.

Upon the minimum input voltage of the SMPS chip 1000 being set to V2−Ve, the countdown timer circuit is activated, and when the countdown timer 130 expires, the SMPS chip 1000 charges the capacitor 204 to the open-circuit voltage V1, and the cycle T1-T8 is repeated to again determine the maximum power output. This can cope with variation of the maximum power output of the solar photovoltaic panel due to interference from the sunlight illumination intensity, illumination angle or any other environmental factor and enable real-time maximum power output tracking. It would be appreciated that if the SMPS chip 1000 has determined the maximum power output within the first half cycle T1-T4, the operations in the second half cycle T5-T8 can be not carried out.

Figure 9:
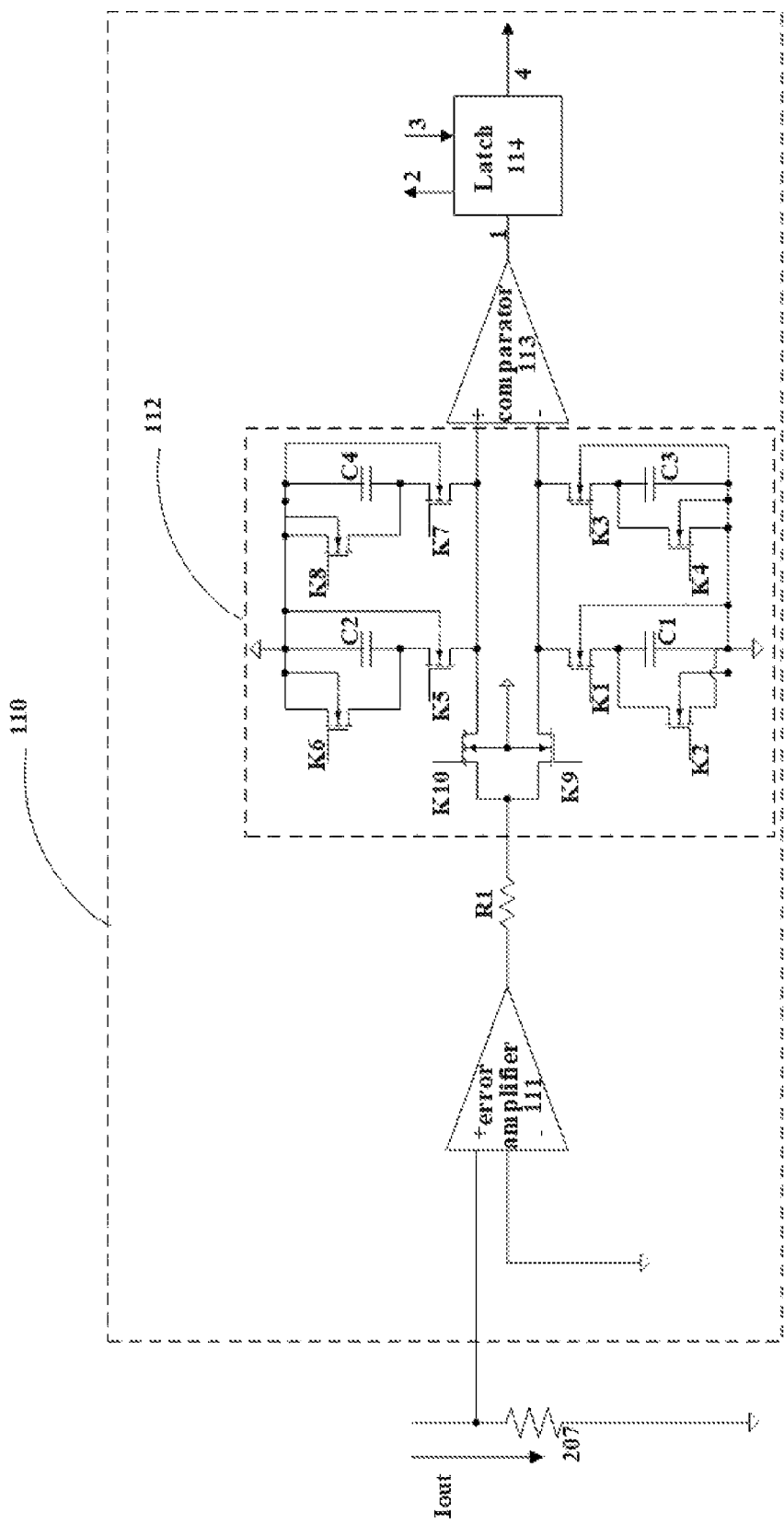
FIG. 9 schematically illustrates exemplary wiring of the sampled current comparator module according to an embodiment of the present invention.

FIG. 9 schematically illustrates exemplary wiring of the sampled current comparator module 110 according to an embodiment of the present invention. Specifically, the sampled current comparator module 110 includes the error amplifier 111, the resistor R1, the comparator 113, the latch 114 and the voltage storage member 112, and the voltage storage member 112 includes the switches K1-K10 and the capacitor C1-C4. In this embodiment, the switches K1-K10 are implemented as n-type metal-oxide-semiconductor (NMOS) transistors. Gates of the switches K1-K10 are coupled to the external logic control module 140 in order to receive therefrom logic control signals for closing or opening the switches K1-K10. It would be appreciated that since the source and drain of a MOS transistor is typically fixed in a circuit, the source may be connected to the substrate in order to eliminate any adverse influence of the substrate's potential VGS of the MOS transistor. Moreover, MOS transistors manufactured by the existing MOS processes are symmetrical ones with their source and drain being interchangeable and identified only depending on their voltage relative to an external circuit. Therefore, in this embodiment of the present invention, in order to prevent charging errors that may be caused by current backflow from body diodes of the MOS transistors, the substrate of the NMOS transistors K1-K10 may be ground to avoid leakage from the body diodes. It would be appreciated that in other embodiments, the switches K1-K10 may also be implemented as other electronic switching elements with closing and opening capabilities.

As shown in FIG. 9, in this embodiment, the first input terminal of the error amplifier 111 is coupled to one end of the output current sampling resistor 207, and the second input terminal of the error amplifier 111 is grounded. The output terminal of the error amplifier 111 is coupled to one end of the resistor R1, and the other end of the resistor R1 is coupled to sources of K10 and K9. A drain of K10 is coupled to drains of K5 and K7 and the second input terminal of the comparator 113, and a drain of K9 is coupled to drains of K1 and K3 and the first input terminal of the comparator 113. One end of the capacitor C1 is coupled to both a source of K1 and a drain of K2, and the other end of the capacitor C1 is coupled to a source of K2 and grounded. One end of the capacitor C3 is coupled to both a source of K3 and a drain of K4, and the other end of the capacitor C3 is coupled to a source of K4 and grounded. One end of the capacitor C2 is coupled to both a drain of K6 and a source of K5, and the other end of the capacitor C2 is coupled to a source of K6 and grounded. One end of the capacitor C4 is coupled to both a drain of K8 and a source of K7, and the other end of the capacitor C4 is coupled to a source of K8 and ground. The output terminal of the comparator 113 is coupled to the first terminal of the latch 114. The second terminal of the latch 114 is coupled to the first end of the timer 130, and the second end of the timer 130 is coupled to the logic control module 140. The third terminal of the latch 114 is configured to receive the enable signal S1 from the logic control module 140, and the fourth terminal of the latch 114 is configured to output the comparison result to the logic control module 140.

The SMPS chip and system provided in embodiments of the present invention detect the output current from the SMPS system to the external load and take it as a basis for incrementally adjusting the minimum input voltage of the SMPS chip and hence the output voltage of the solar photovoltaic panel. In this way, an output voltage corresponding to the maximum power output of the solar photovoltaic panel under a given condition can be determined and maintained, ensuring that the solar photovoltaic panel operates with the maximum output power. Moreover, the SMPS chip performs this maximum power output determination of the solar photovoltaic panel at regular intervals and can automatically ensure in real time that the solar photovoltaic panel can always operate with the maximum output power in various environments.

The SMPS chip and system provided in embodiments of the present invention achieve maximum power output tracking by only hardware without modifying the chip's structure or adding other pins thereto. The SMPS chip and system provided in embodiments of the present invention are very suitable for use in applications of solar photovoltaic panels that require maximum power output tracking to charge and store energy in a battery pack module because they allow increased utilization of output power of the solar photovoltaic panels, improved energy conversion efficiency and more harvested solar energy per unit time.

In the above, each embodiment is described with individual emphasis, and for details of any feature that is not detailed in a certain embodiment, reference can be made to the description of any other embodiment with such details.

The SMPS chip and system provided in embodiments of the present invention have been described in detail by way of specific examples that demonstrate the principles and embodiments of this invention and these embodiments are presented for the sole purpose of facilitating an understanding of the technical essence and concept of this application. It is to be understood by those of ordinary skill in the art that although they may make various modifications to the disclosed embodiments or substitute some or all features thereof with equivalents, all such modifications and equivalent substitutions are not considered to deviate the technical essence of the respective newly obtained embodiments from the scope of the embodiments of this application.

What is claimed is:

1. A switched-mode power supply (SMPS) chip for determining a maximum power output of a solar photovoltaic panel that is connected to the SMPS chip, the SMPS chip comprising a sampled current comparator module, a logic control module connected to the sampled current comparator module, and a charge/discharge control module connected to the logic control module, the sampled current comparator module comprising a voltage storage member, a comparator connected to the voltage storage member and a latch connected to the comparator, wherein:

a first voltage storage unit in the voltage storage member stores a first voltage within a first period of time, the first voltage corresponding to a first sampled current, which is received by the SMPS chip in the first period of time and flows through an external load;

the charge/discharge control module causes an external tracking capacitor to discharge within a second period of time, thereby lowering a minimum input voltage of the SMPS chip from a first input voltage corresponding to the first sampled current to a second input voltage; and a second voltage storage unit in the voltage storage member stores a second voltage within a third period of time following the second period of time, the second voltage corresponding to a second sampled current, which is received by the SMPS chip in the third period of time and flows through the external load, the second sampled current corresponding to the second input voltage;

the comparator compares the first voltage with the second voltage within a fourth period of time following the third period of time and responsively outputs a first comparison result to the latch;

the latch latches the first comparison result and outputs a latched first comparison result to the logic control module;

the logic control module outputs a first logic control signal based on the first comparison result to the charge/discharge control module, which then accordingly adjusts the minimum input voltage of the SMPS chip through discharging the external tracking capacitor; and if the first voltage is above the second voltage, the logic control module instructs the charge/discharge control module to stop discharging the external tracking capacitor so that the minimum input voltage of the SMPS chip is maintained at the second input voltage and the SMPS chip thus receives the maximum power output from the solar photovoltaic panel, wherein the SMPS chip further comprises a timer connected to the latch in the sampled current comparator module, which is configured to count down a predetermined period of time in which the SMPS chip is maintained at a current minimum input voltage in case of the first voltage being above the second voltage, and wherein the charge/discharge control module comprises a current detector, a switching element and a timer constant-current source, the current detector having a first terminal connected to an output terminal of the solar photovoltaic panel, a second terminal connected to the logic control module and a third terminal connected to the timer constant-current source via the switching element.

2. The SMPS chip of claim 1, wherein if the first voltage is below the second voltage, a third voltage storage unit in the voltage storage member stores a third voltage within a fifth period of time following the fourth period of time, the third voltage being equal to the second voltage.

3. The SMPS chip of claim 2, wherein within a sixth period of time following the fifth period of time, the logic control module instructs the charge/discharge control module to pull the minimum input voltage of the SMPS chip from the second input voltage corresponding to the second sampled current down to a third input voltage.

4. The SMPS chip of claim 3, wherein a fourth voltage storage unit in the voltage storage member stores a fourth voltage within a seventh period of time following the sixth period of time, the fourth voltage corresponding to a third sampled current, which is received by the SMPS chip in the seventh period of time and flows through the external load, the third sampled current corresponding to the third input voltage.

5. The SMPS chip of claim 4, wherein the comparator compares the third voltage with the fourth voltage within an eighth period of time following the seventh period of time and responsively outputs a second comparison result to the latch, wherein the latch latches the second comparison result and outputs a latched second comparison result to the logic control module; and wherein the logic control module outputs a second logic control signal based on the second comparison result to the charge/discharge control module, which then again adjusts the minimum input voltage of the SMPS chip accordingly through discharging the external tracking capacitor.

6. The SMPS chip of claim 5, wherein in the fifth to eighth periods of time, each of the first and second voltage storage units is discharged to an initial state.

7. The SMPS chip of claim 4, wherein the sampled current comparator module further comprising an error amplifier for deriving first, second and third sampled voltages from the first, second and third sampled currents, the first sampled voltage providing the first voltage to the first voltage storage unit, the second sampled voltage providing the second and third voltages to the second and third voltage storage units, respectively, the third sampled voltage providing the fourth voltage to the fourth voltage storage unit.

8. The SMPS chip of claim 1, wherein the timer constant-current source causes the external tracking capacitor to discharge to lower the minimum input voltage of the SMPS chip under the control of the first logic control signal output from the logic control module in case of the first voltage being below the second voltage.

9. The SMPS chip of claim 1, wherein the voltage storage member comprises first, second, third, fourth, fifth, sixth, seventh, eighth, ninth and tenth switches and first, second, third and fourth capacitors, the first capacitor connected in parallel to the second switch, one end of the first capacitor connected in series with one end of the first switch, the other end of the first capacitor grounded, the other end of the first switch connected to the ninth switch and a first input terminal of the comparator, the third capacitor connected in parallel to the fourth switch, one end of the third capacitor connected in series with one end of the third switch, the other end of the third capacitor grounded, the other end of the third switch connected to the ninth switch and the first input terminal of the comparator, the second capacitor connected in parallel to the sixth switch, one end of the second capacitor connected in series with one end of the fifth switch, the other end of the second capacitor grounded, the other end of the fifth switch connected to the tenth switch and a second input terminal of the comparator, the fourth capacitor connected in parallel to the eighth switch, one end of the fourth capacitor connected in series with one end of the seventh switch, the other end of the fourth capacitor grounded, the other end of the seventh switch connected to the tenth switch and the second input terminal of the comparator.

10. A system comprising the SMPS chip of claim 1,
wherein the external tracking capacitor has a ground first end, and
wherein the external tracking capacitor has a second end connected to the timer constant-current source in the charge/discharge control module so that the timer constant-current source is able to cause the external tracking capacitor to discharge and thereby lower the minimum input voltage of the SMPS chip.

* * * * *